United States Patent

Yamada et al.

[11] Patent Number: 5,814,909
[45] Date of Patent: Sep. 29, 1998

[54] ELECTRIC MOTOR HAVING HEAT RADIATOR AT ELECTRIC CONNECTION WITH INVERTER

[75] Inventors: Eiji Yamada, Owariasahi; Takao Miyatani, Toyota; Yasutomo Kawabata, Aichi-ken, all of Japan

[73] Assignee: Toyota Jidosha Kabushiki Kaisha, Toyota, Japan

[21] Appl. No.: 492,136

[22] Filed: Jun. 19, 1995

[30] Foreign Application Priority Data

Aug. 8, 1994 [JP] Japan ................................ 6-185875

[51] Int. Cl.⁶ ...................... H02K 11/00; H02K 5/00
[52] U.S. Cl. ...................... 310/64; 310/68 R; 310/71; 310/52
[58] Field of Search ......................... 361/705, 712, 361/704; 310/64, 65, 52, 68 R, 68 C, 71; 174/15.1, 15.6

[56] References Cited

U.S. PATENT DOCUMENTS

| 5,107,366 | 4/1992 | Huang et al. | 359/223 |
| 5,408,049 | 4/1995 | Gale et al. | 174/105 R |

FOREIGN PATENT DOCUMENTS

| A-4-242 | 1/1992 | Japan | 310/64 |
| A-6-30547 | 2/1994 | Japan | 310/34 |
| A-6-99745 | 4/1994 | Japan | 310/64 |

*Primary Examiner*—Steven L. Stephan
*Assistant Examiner*—Karl Imayoshi Tamai
*Attorney, Agent, or Firm*—Oliff & Berridge, PLC

[57] ABSTRACT

Electric motor coils are electrically connected to a power device in an inverter. A conductor for supplying a drive current to the motor coils includes a heat radiating area or other heat radiating member in the wiring path. Thus, the heat from the electric motor is radiated from the conductor in the wiring path. The power device and other components of the inverter can be prevented from being thermally damaged or degraded by the heat transmitted from the motor coils to the inverter through the conductor having higher heat conductivity.

5 Claims, 6 Drawing Sheets

000000## ELECTRIC MOTOR HAVING HEAT RADIATOR AT ELECTRIC CONNECTION WITH INVERTER

BACKGROUND OF THE INVENTION

1. Field of the Invention

The present invention relates to an electric motor and particularly to a cooling structure in a so-called motor built-in inverter system which comprises an electric motor and an inverter for supplying electric power to the motor, the motor and inverter being housed together within a casing.

2. Description of the Prior Art

Such a motor built-in inverter system is known, for example, from Japanese Patent Laid-Open Publication No. Hei 4-242. The structure thereof will be described with reference to FIG. 1.

In the motor built-in inverter system, an electric motor has a stator 16 and a rotor 10 which includes a permanent magnet 12 on the side opposed to the stator 16. The stator 16 includes a plurality of slots (not shown) formed therein, each of which receives a coil 20. The rotor 10 has a shaft 14 for transmitting the rotation thereof to any externally by connected device.

The coils 20 are electrically connected to an inverter 40 through a conductor such as copper wire. The inverter 40 is bodily disposed within an outer casing 54 in which the electric motor is also housed. The inverter 40 is comprised of a power device, a smoothing capacitor, a control for controlling the phase, magnitude and other parameters of the drive current in the motor, and so on.

As a given AC drive current is outputted from the inverter 40 toward the coils 20 of different phases through the conductor 22, an alternating field corresponding to the AC drive current is produced in the stator 16 to generate a torque for rotatably driving the rotor 10.

Between the motor and the inverter 40 there is further disposed a fluid passage 50 through which externally supplied cooling water flows. Thus, the transmission of heat from the motor to the inverter 40 is prevented which in turn prevents increase of the temperature at the inverter 40.

The conductor 22 electrically connecting between the coils 20 of the motor and the power device of the inverter 40 is generally formed of a metal material having high heat conduction, such as copper.

Since the motor was located close to the inverter 40 in the conventional motor built-in inverter system, it could not be avoided that the heat is transmitted from the motor having a higher temperature than that of the inverter 40 to the power device and other components of the inverter 40 through the conductors 22. The power device and other components in the inverter 40 may be thermally damaged or degraded.

Particularly, if the motor and inverter casings are connected to each other through the conductor such that the electromagnetic waves from the conductors are prevented from externally leaking, the conductor is subject to the influence of the heating atmosphere within the casings. This may increase the aforementioned defects.

SUMMARY OF THE INVENTION

To overcome the above problems, it is an object of the present invention to prevent the transmission of heat from the electric motor to the inverter through the conductors.

To this end, the present invention provides an electric motor having an inverter and motor coils electrically connected to the inverter, electric power being supplied from the inverter to the motor coils, the electric motor comprising two conductors respectively connected to the motor coils and inverter, the two conductors being electrically connected to each other through an electrically conductive member having a heat conductivity lower than that of the conductors, thereby transmitting electric power from the inverter to the motor coils through the conductors and conductive member.

Such an arrangement is particularly effective in a motor built-in inverter system in which the inverter is connected integrally to the electric motor and located close to the electric motor.

A heat radiating member may be disposed on the outer wall of the motor casing to improve the heat radiation in the motor itself.

In another aspect, the present invention provides an electric motor having an inverter and motor coils electrically connected to the inverter, electric power being supplied from the inverter to the motor coils, the electric motor comprising a conductor electrically connecting between the motor coils and the inverter, the conductor including a heat radiating member mounted thereon in the wiring path.

Such an arrangement can be suitably applied to a motor built-in inverter system in which the inverter is connected integrally to the electric motor and located close to the electric motor.

In the motor built-in inverter system, the inverter may include a cooling portion for cooling the inverter. The conductor electrically connecting between the motor coils and the inverter may be disposed to extend through the cooling portion which functions as the heat radiating member.

Alternatively, the motor built-in inverter system may use an insulator as a heat radiating member.

A heat radiating member may be mounted on the outer wall of the motor casing.

In still another aspect, the present invention provides an electric motor having an inverter and motor coils electrically connected to the inverter, electric power being supplied from the inverter to the motor coils, the electric motor comprising a conductor electrically connecting between the motor coils and the inverter, the conductor including an area of high heat radiation formed therein at at least part of the wiring path.

Such an arrangement is similarly effective in a motor built-in inverter system.

In the motor built-in inverter system, the high heat radiation area of the conductor may include a plurality of folds.

Alternatively, the conductor or conductors may be formed of a multi-layered conductive material.

In the motor built-in inverter system, the high heat radiation area of the conductor may be formed into a flat plate.

In the motor built-in inverter system, a heat radiating member may be mounted on the outer wall of the motor casing.

In the motor built-in inverter system of the present invention, the conductor or conductors electrically connecting between the motor coils and the inverter may include heat radiating means. Thus, the heat produced in the motor can be radiated from the wiring path of the conductor or conductors. Therefore, the heat from the motor can be prevented from being transmitted to the inverter through the conductor or conductors. Even if a high current is supplied to the motor coils to increase the load, the power device and other components in the inverter can be reliably prevented from being thermally damaged or degraded.

DETAILED DESCRIPTION OF THE PREFERRED EMBODIMENTS

Figure 1:
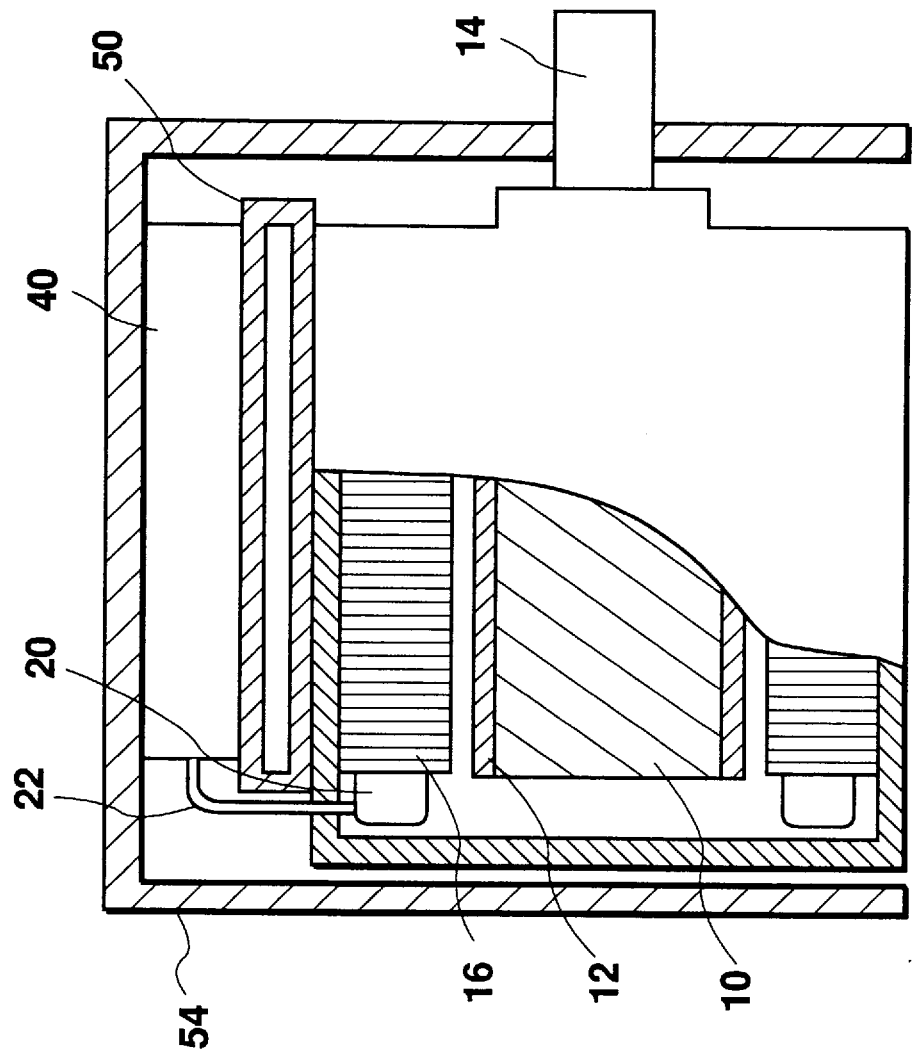
FIG. 1 is a fragmentary cross-section of a motor built-in inverter system constructed in accordance with the prior art.

Some preferred embodiments of the present invention will be described with reference to the drawings in which similar parts are designated by similar reference numerals.

First Embodiment

Figure 2:
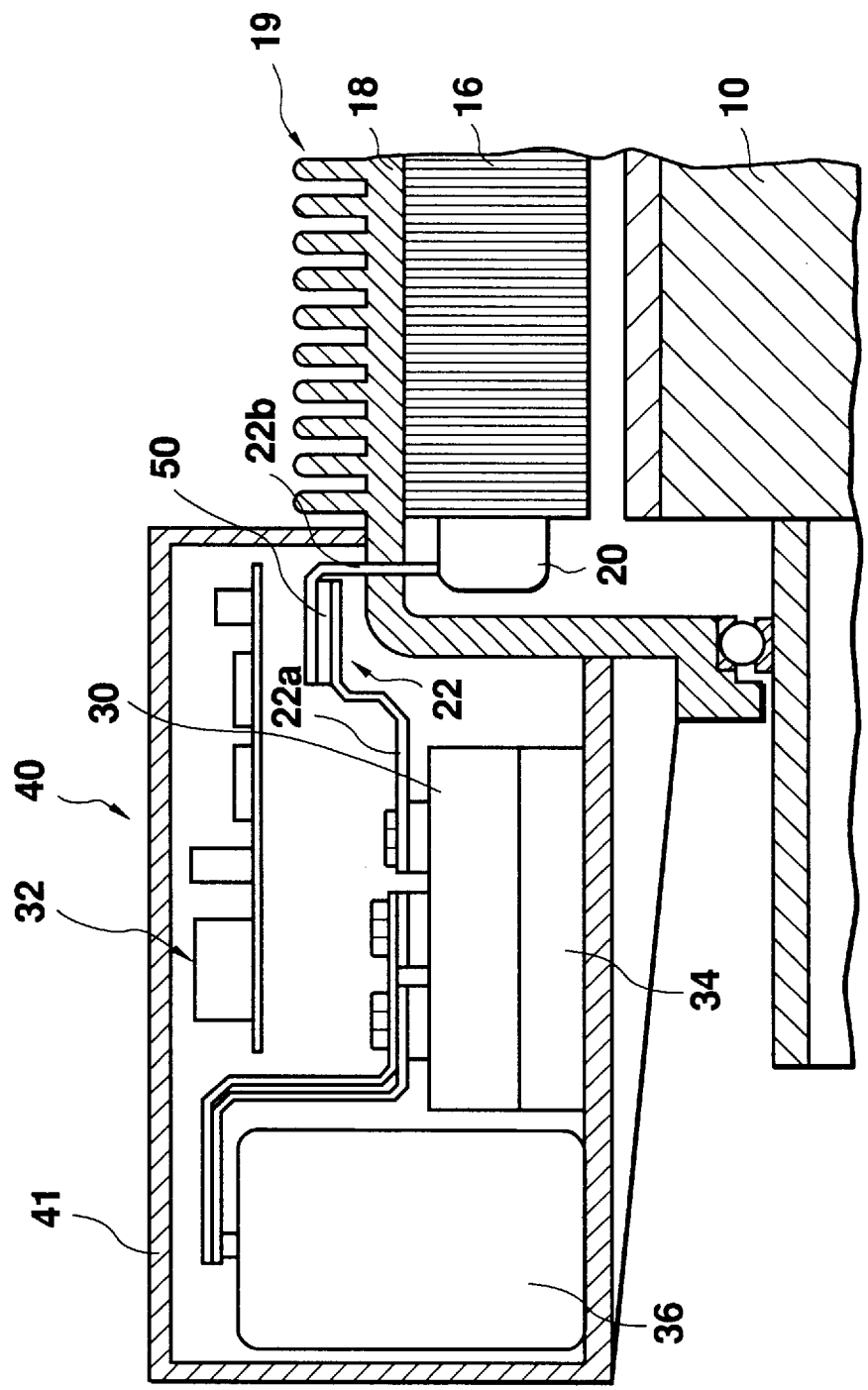
FIG. 2 is a fragmentary cross-section of a motor built-in inverter system constructed in accordance with a first embodiment of the present invention.

FIG. 2 is a fragmentary cross-section of a motor built-in inverter system constructed in accordance with a first embodiment of the present invention.

As shown, an electric motor comprises a stator 16, having a laminated structure for reducing core loss, and a rotor 10. The stator 16 includes a plurality of slots formed therein, each of which receives a coil 20. The stator 16 is covered with a motor casing 18. The motor casing 18 is mounted integrally on an inverter casing 41. A portion of the motor casing 18 opposed to the stator 16 includes heat radiating fins 19 formed therein. The inverter casing 41 receives an inverter 40 which is electrically connected to the coils 20 in the motor casing 18 through a conductor 22 such as copper wire.

The inverter 40 comprises a power device 30, a smoothing capacitor 36 connected to the power device 30 and a controller 32. The power device 30 may comprise six output transistors which receive DC power from a power source (not shown) through the capacitor 36. The controller 32 may include a control circuit for controlling the phase, magnitude and other parameters of a drive current supplied from the power device 30 to the coils 20. The controller 32 is electrically connected to the power device 30 to thus control it.

The conductor 22 comprises a conductor section 22a connected to the power device 30 of the inverter 40 and another conductor section 22b connected to the coils 20 of the electric motor. The conductor sections 22a and 22b are electrically connected to each other through an electrically conductive member 50 within the inverter casing 41. The conductive member 50 is formed of a material having a heat conductivity lower than that of the copper conductor 22, such as carbon or the like.

Heat produced in the motor coils 20 is transmitted to the conductive member 50 through the conductor section 22b. However, the heat will be radiated from the conductive member 50 since the heat conductivity thereof is lower. Therefore, the heat will not be transmitted from the motor coils 20 to the power device 30 through the conductor section 22a connected to the power device 30. As a result, the power device 30 will not be subject to the influence of heat from the motor coils and be thermally damaged or degraded.

In the first embodiment, the inverter 40 includes a cooling portion 34 on the power device 30 for cooling it. The cooling portion 34 may be in the form of heat radiating fins, a heat radiating plate or a cooler through which cooling water is circulated.

In the first embodiment, the inverter 40, and particularly its power device 30, is hardly subject to heat from the power device, and motor. Therefore, the power device can be reliably prevented from being thermally damaged or degraded. The first embodiment of the present invention is suitable for use in any electric motor on which a load is relatively high, for example, through high rotational speed.

Second Embodiment

Figure 3:
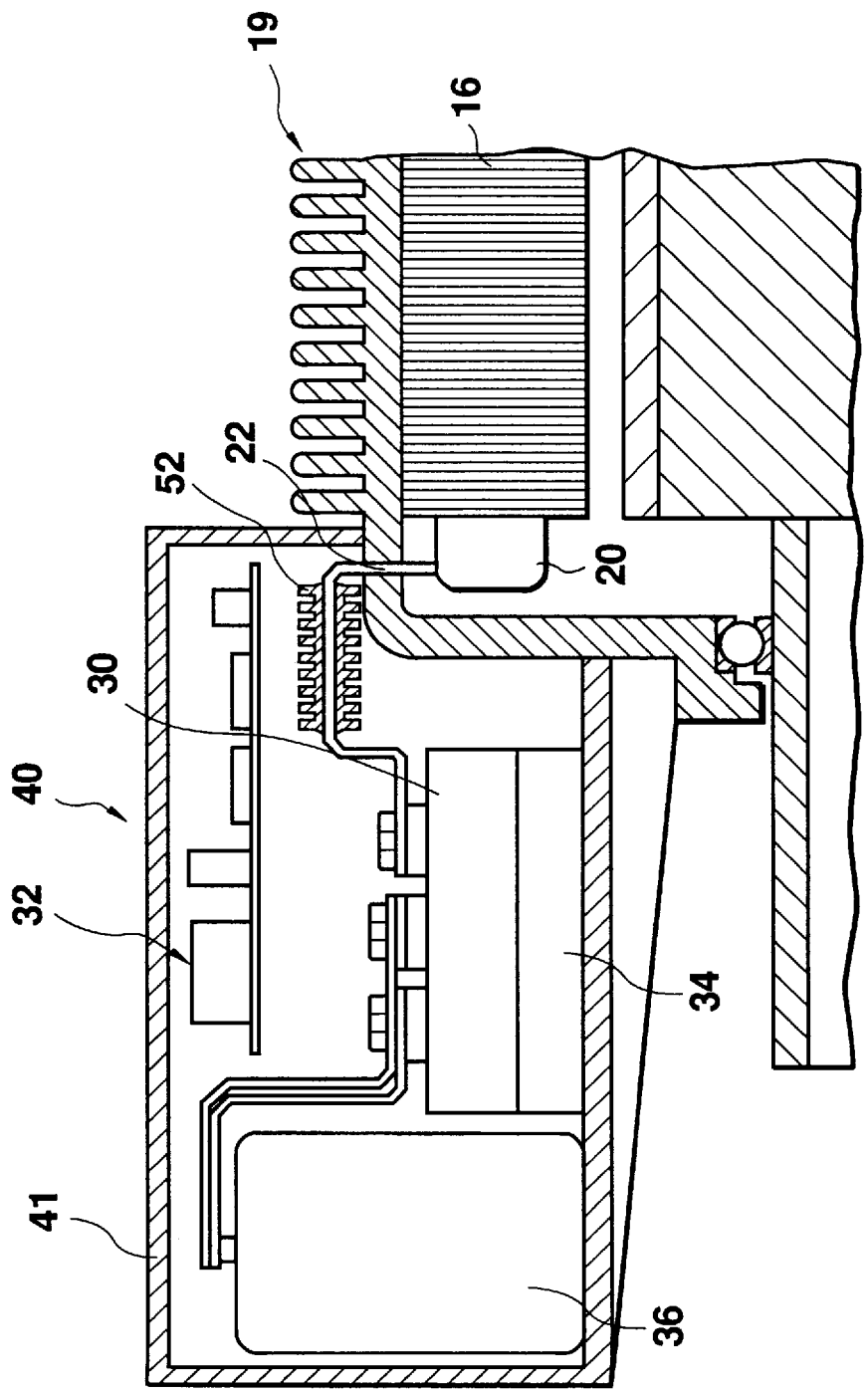
FIG. 3 is a fragmentary cross-section of a motor built-in inverter system constructed in accordance with a second embodiment of the present invention.

A motor built-in inverter system having a heat radiating mechanism different from that of the first embodiment will be described with reference to FIG. 3.

The second embodiment is characterized by that a heat radiating member 52 of an insulator or the like (e.g. ceramics) is mounted in the wiring path of a conductor 22 electrically connecting between the coils 22 and the power device 30. Such a heat radiating member 52 can improve the heat conductivity in the conductor 22.

Thus, the heat transmitted from the motor through the conductor can be radiated at the heat radiating member such that the power device can be reliably prevented from being thermally damaged or degraded. The heat radiating member 52 is not necessarily formed of an insulator such as ceramics, but may be made of any other heat radiation material which is generally used. If the heat radiating member 52 is in the form of fins as shown in FIG. 3, the heat radiation can be further improved.

In the first embodiment, the conductor sections 22a and 22b of the power device 30 and motor coils 20 must be electrically connected to the heat radiating member 50. This requires more manufacturing steps than the conventional motor built-in inverter systems. In the second embodiment, however, it is only required that the heat radiating member 52 be mounted in the wiring path of the conductor 22 in the existing motor built-in inverter system as shown in FIG. 1. This provides an extremely simple process to improve the workability.

Third Embodiment

Figure 4:
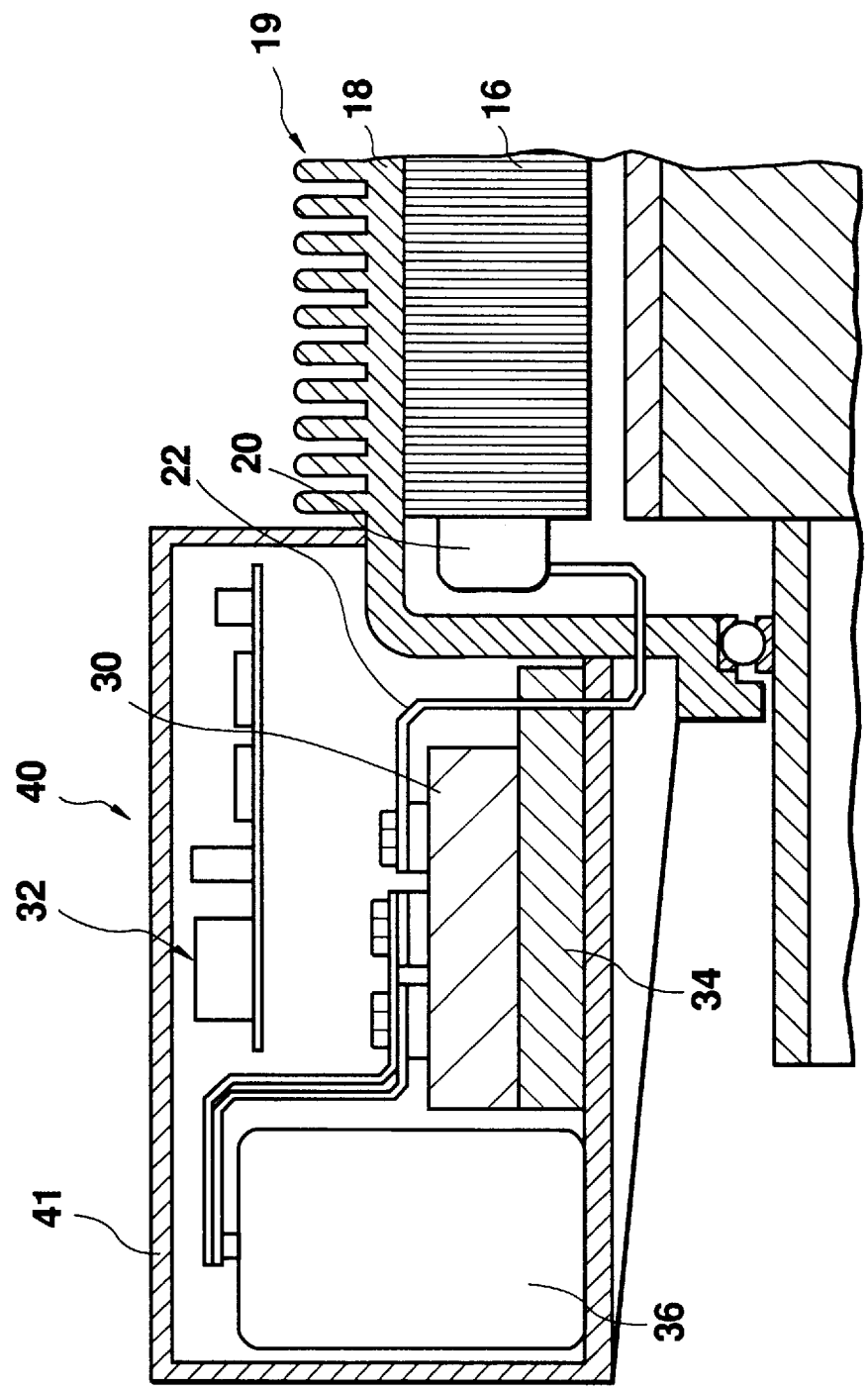
FIG. 4 is a fragmentary cross-section of a motor built-in inverter system constructed in accordance with a third embodiment of the present invention.

A motor built-in inverter system having a heat radiating mechanism different from those of the first and second embodiment will be described with reference to FIG. 4.

The third embodiment is characterized by that the conductor 22 electrically connecting between the coils 22 and the power device 30 is arranged to extend through a cooling portion 34. This enables the conductor 22 to be forcedly cooled by the cooling portion 34. Therefore, the heat will not be transmitted from the electric motor to the power device through the conductor. As a result, the power device can be reliably prevented from being thermally damaged or degraded by the heat from the electric motor.

The cooling portion can simultaneously cool both the power device and conductor. Therefore, the power device can be protected without increase in the number of parts. This is advantageous from the point of view of manufacturing cost.

To deal with an increase of heat in the motor from an increased load thereon, the capacity of the cooling portion may be increased depending on the load of the electric motor. For example, if the load is larger (i.e., the output current is larger), the cooling portion may be controlled to increase the amount of circulated cooling water for cooling the conductor.

Fourth Embodiment

A motor built-in inverter system having a heat radiating mechanism different from those of the previously described embodiments will be described with reference to FIG. 5.

The fourth embodiment is characterized by that a conductor 22 electrically connecting between the coils 20 and the power device 30 includes a plurality of folds 54 formed into a coil-shaped or wave-shaped configuration. When these folds 54 are formed in at least part of the wiring path of the conductor 22, the heat radiating area of the conductor 22 can be increased.

The heat from the motor coils 20 can be radiated as it flows through the folds 54. Thus, the power device 30 in the inverter 40 can be reliably prevented from being thermally damaged or degraded by the heat from the electric motor.

If such folds 54 are formed along the length of the conductor 22, the heat radiating area can be further increased to provide more heat radiation at the conductor 22. The total length of the folds 54 may be determined to provide reliable radiation of the heat from the electric motor at the conductor 22, depending on the system size and the heat value at the motor.

If the folds 54 are formed in at least part of the wiring path of the conductor 22 as in the fourth embodiment, vibration (and particularly vibration in the electric motor) can be absorbed by the folds 54. The connections between the coils, power device and conductor can be prevented from being damaged by the vibration.

Figure 7:
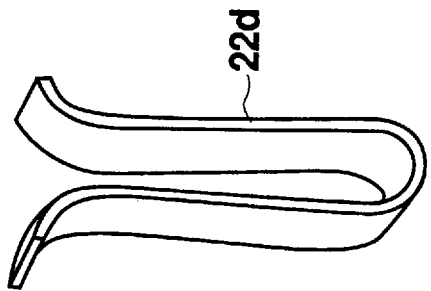
FIG. 7 is a view illustrating the structure of a conductor according to a further embodiment of the present invention.
Figure 6:
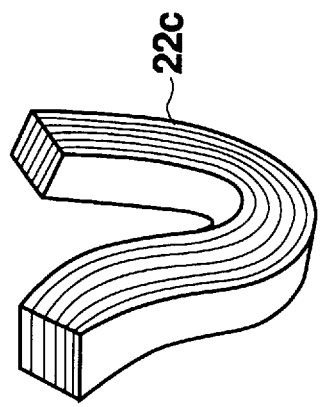
FIG. 6 is a view illustrating the structure of a conductor according to a further embodiment of the present invention.

FIGS. 6 and 7 show improvements of the conductor 22 for increasing the heat radiation therein.

Referring to FIG. 6, there is shown a conductor 22c of multi-layered structure which comprises a plurality of electrically conductive thin-films. If the conductor is formed of copper, a plurality of copper foils are laminated to form the conductor 22c. Such a laminated structure can increase the heat radiating area of the conductor 22c, in comparison with the conductor 22 of copper wire as shown in FIG. 5.

As shown in FIG. 7, at least part of the conductor may be formed into a flat plate 22d to increase the heat radiation.

Figure 5:
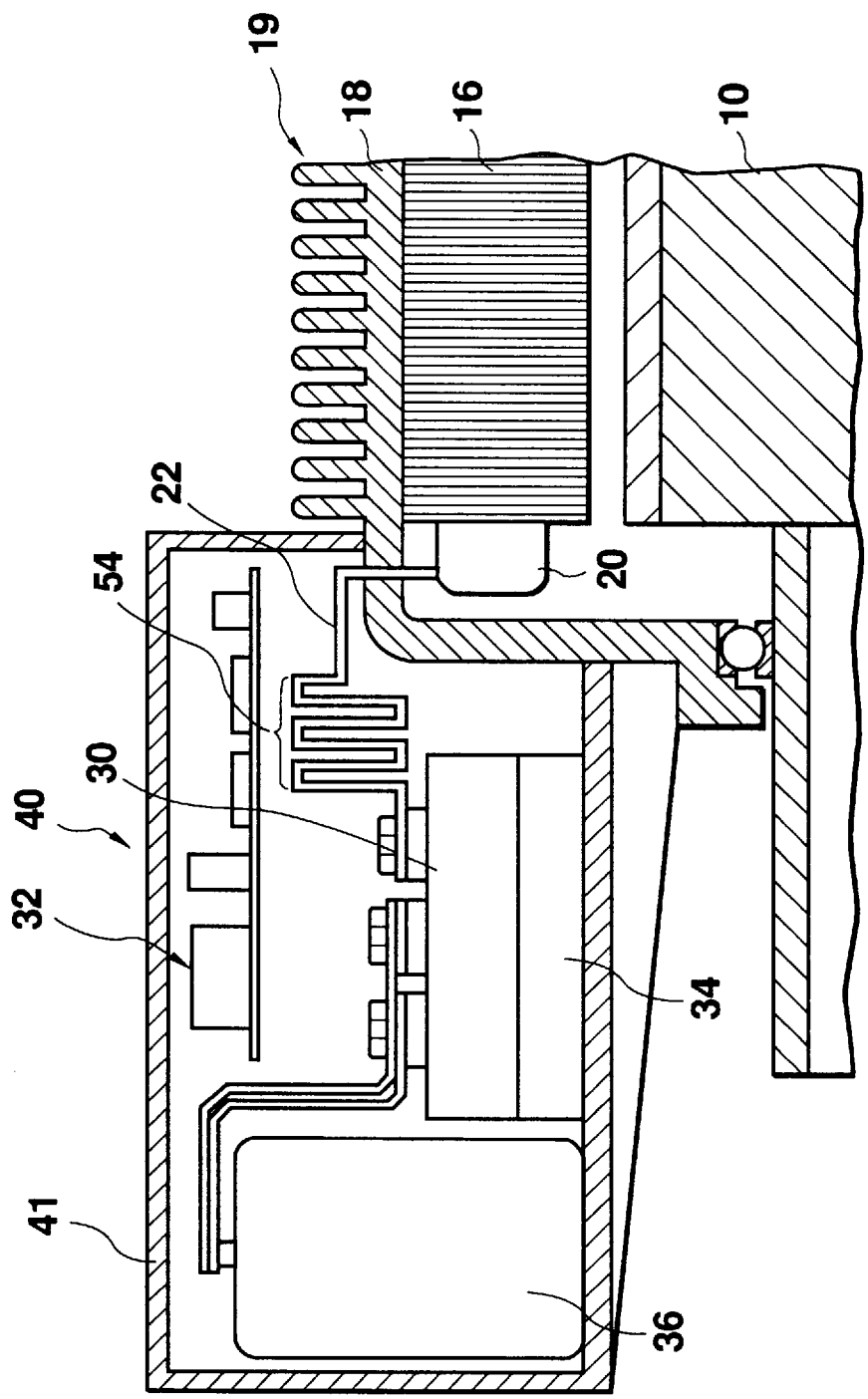
FIG. 5 is a fragmentary cross-section of a motor built-in inverter system constructed in accordance with a fourth embodiment of the present invention.

Such conductors 22c and 22d may be wound to have a plurality of bends (or folds) in the wiring path and electrically connected between the coils 20 and power device 30 shown in FIG. 5 to provide a further increased heat radiating area in the wiring path of the conductor 22 shown in FIG. 5.

Thus, the heat from the motor coil can be reliably radiated as it flows through the conductor 22. The power device in the converter can be prevented from being thermally damaged or degraded by the heat from the electric motor.

Such conductors 22c and 22d as shown in FIGS. 6 and 7 may be applied not only to the conductor 22 of the fourth embodiment, but also to the conductors 22 of the first to third embodiments. When the conductor of FIGS. 6 or 7 is applied to the first to third embodiments, the heat radiation in the wiring path of the conductor can be further improved.

The heat radiating structures described in connection with the previously described embodiments can be applied to any other system comprising an inverter and electric motor separately arranged therein, in addition to the motor built-in inverter system.

As described, the motor built-in inverter system of the present invention includes a heat radiating measure in the conductor electrically connecting between the motor coils and inverter. Thus, the heat from the electric motor is radiated from the conductor in the wiring path. The heat will not be transmitted from the electric motor to the inverter through the conductor. If an increased load is applied to the electric motor (e.g., a high current passes through the coils), the power device and other components in the inverter can be reliably prevented from being thermally damaged or degraded by the heat from the electric motor.

More particularly, the conductor section connected to the inverter is electrically connected to the conductor section connected to the motor coils through the electrically conductive member having lower heat conductivity. Thus, the transmission of heat from the electric motor to the inverter through the conductor can be avoided. Therefore, the inverter will not be thermally damaged or degraded by the heat from the electric motor.

When the heat radiating member is mounted in the wiring path of the conductor electrically connecting between the electric motor and the inverter, the heat radiation at the conductor can be improved. Merely by mounting the heat radiating member through an extremely simple process, the heat from the motor through the conductor can be radiated from the heat radiating member.

When the conductor is mounted to extend through the inverter cooling portion such that the conductor is forcedly cooled by the cooling portion, the heat transmitted from the electric motor through the conductor can be forcedly cooled by the cooling portion. The power device of the inverter can be prevented from being thermally damaged or degraded by the heat from the electric motor. The cooling portion can simultaneously cool both the power device and conductor. Therefore, the power device can be protected without increase in the number of parts. This is extremely advantageous from the point of view of the manufacturing cost.

When at least part of the conductor electrically connecting between the electric motor and the inverter is formed to have a plurality of bends in a coil-shaped or wave-shaped configuration, the heat radiating area of the conductor can be increased in the wiring path. The heat from the electric motor can be radiated from the folds in the conductor. Therefore, the inverter can be prevented from being thermally damaged or degraded by the heat from the electric motor.

When the conductor is formed having a laminated structure comprising a plurality of electrically conductive films, the heat radiating area of the conductor can be further increased compared to a single-layer conductor.

When the conductor is formed into a flat plate in at least part of the wiring path, the heat radiating area of the conductor can be similarly increased.

Since the heat from the electric motor can be radiated from the conductor itself, the inverter can be reliably prevented from being thermally damaged or degraded by the heat from the electric motor.

We claim:

1. An electric motor having an inverter and motor coils electrically connected to the inverter, electric power being supplied from said inverter to said motor coils, said electric motor comprising two conductors respectively connected to said motor coils and inverter, said two conductors being electrically connected to each other through an electrically conductive member having a heat conductivity lower than that of said conductors, thereby transmitting electric power from said inverter to said motor coils through said conductors and conductive member.

2. An electric motor as defined in claim 1 wherein said electric motor is a motor built-in inverter system in which the inverter is connected integrally to the electric motor and located close to the electric motor.

3. An electric motor as defined in claim 1 wherein a heat radiating member is disposed on the outer wall of the motor casing.

4. The electric motor according to claim 1, wherein said electrically conductive member comprises a heat radiating member.

5. The electric motor according to claim 4, wherein said heat radiating member is in the form of a flat plate.

\* \* \* \* \*